Feb. 2, 1960 — W. W. MOUNT — 2,923,045
SNAP SHACKLE
Filed March 16, 1956
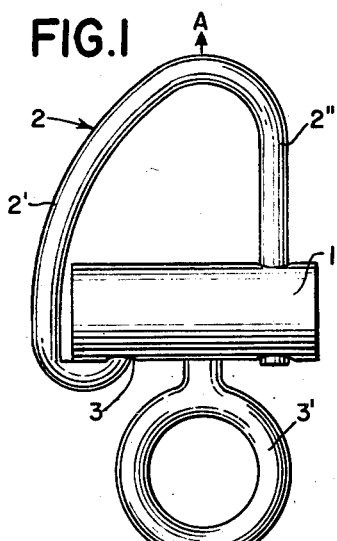
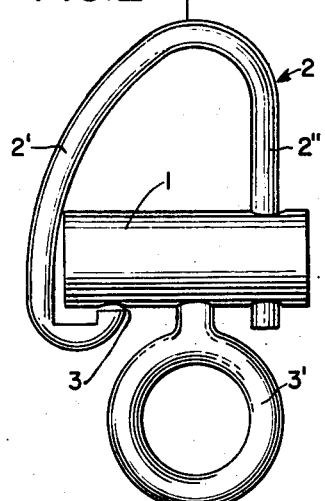
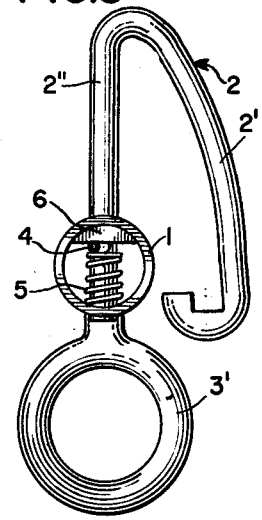
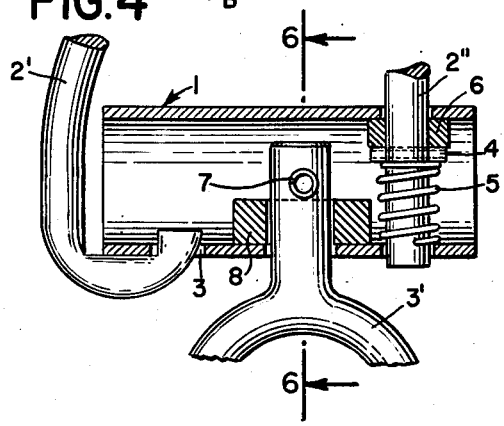
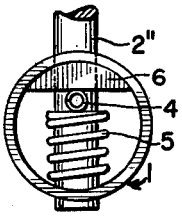
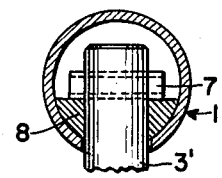
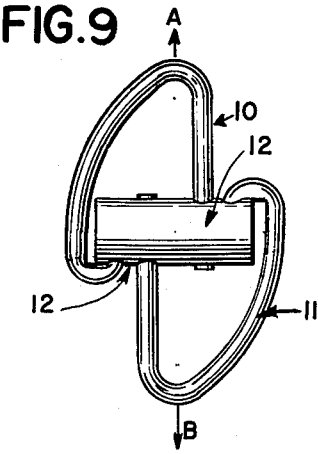
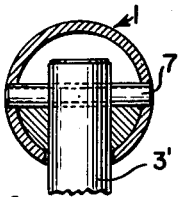
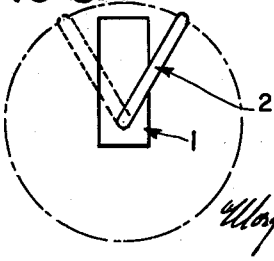
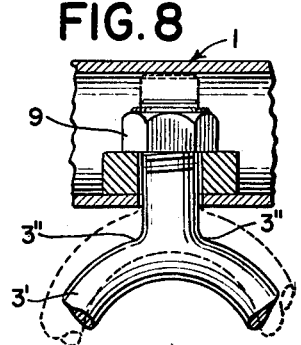
INVENTOR
WADSWORTH W. MOUNT
ATTORNEYS United States Patent Office 2,923,045
Patented Feb. 2, 1960

2,923,045

SNAP SHACKLE

Wadsworth W. Mount, Chatham, N.J.

Application March 16, 1956, Serial No. 571,945

10 Claims. (Cl. 24—235)

The present invention relates to a new type of snap shackle which is particularly useful in connection with rigging or mooring equipment for boats.

Objects and advantages of the invention will be set forth in part hereinafter and in part will be obvious therefrom, or may be learned by practice with the invention, the same being realized and attained by means of the combinations, improvements and instrumentalities pointed out in the appended claims.

The invention consists in the novel parts, constructions, arrangements, combinations and improvements herein shown and described.

The accompanying drawing, referred to herein and constituting a part hereof, illustrates various embodiments of the invention, and together wtih the description serves to explain the principles of the invention.

In the handling and mooring of boats, particularly sailing craft, it is highly desirable to have a line-fastening or -connecting device adapted for speedy one-hand operation for either connecting or disconnecting. It is also desirable to have such a device adapted for speedy opening in more than one direction from a closed and locked position, and which may be manipulated one-handedly to a closed and locked position from any open position with the help of a positive guide, thus eliminating guess work and trial and error.

It is an object of the present invention to provide a snap shackle which is adapted to be speedily opened, engaged and closed by a one-hand operation.

A further object is to provide such a device which will permit such a one-hand operation to a completely open position in more than one direction from its closed and locked position.

Still another object is to provide such a device in which the shackle clevis may be positively guided to its closed and locked position by reason of the mechanical relationship of the parts.

Yet another object of this invention is to provide a lightweight snap shackle which may be constructed cheaply out of readily available low cost parts.

Another object is to combine a clevis with a closure for the clevis mouth in such fashion as to provide a new and improved snap shackle device in which one leg of the clevis serves as a locking leg and the other as a pivot leg, the locking leg being of as small a cross-section at its free or locking end as is practicable for the type of service for which it is intended, so that the free end can be inserted in small openings in sails or other gear.

Yet another object of this invention is to provide a snap shackle device combining a clevis and closure, which is restrained against opening under load through the provision in the locking leg of the clevis of a reversely curved tip portion serving to provide a bearing surface portion adjacent the tip end of the locking leg for supporting the closure when under load and to provide a locking tip portion at right angles to the bearing surface portion for locking engagement with a locking recess of the closure.

Of the drawing:

Figure 1 is a view in side elevation of an embodiment of the invention showing the shackle in closed and locked position.

Figure 2 is a view in side elevation of the embodiment of Fig. 1 showing the shackle in closed and unlocked position.

Figure 3 is a view in end elevation of the embodiment of Fig. 1 showing the shackle in open position, with certain details of the eye-bolt structure internally of the shackle omitted for clarity, and with the shackle eye-bolt displaced to a position ninety degrees from the position thereof in Fig. 1.

Figure 3A is a plan view of the embodiment of Fig. 1 showing how the shackle clevis may be pivoted in either direction to any position on a circle.

Figure 4 is a fragmentary view in partial vertical section of the embodiment of Fig. 1 showing the relationship of the components internally of the snap shackle.

Figure 5 is a fragmentary view in end elevation of the snap shackle of Fig. 4 as viewed from the right of Fig. 4, the eye-bolt structure being omitted for clarity.

Figure 6 is a fragmentary view in partial section taken along line 6—6 of Fig. 4 showing details of the eye-bolt securing structure.

Figure 7 is a fragmentary view in section as in Fig. 6 showing another manner of securing the eye-bolt.

Figure 8 is a fragmentary view in partial section as in Fig. 4 showing still another manner of securing the eye-bolt, and Figure 9 is a view in side elevation showing a double clevis snap shackle arrangement in accordance with this invention.

The snap shackle of this invention consists essentially in a clevis and a closure member for the mouth of the clevis having a locking recess on the opposite side from the clevis for receiving the free end of one leg of the clevis, the clevis being slidably and pivotally mounted on the closure member by its other leg for reciprocation relative to the closure between a locked position in which said free end is received in said recess and an unlocked position in which said free end is clear of said recess and for swinging movement of said free end into and out of said unlocked position, the closure member being of such length radially from the pivot axis in the direction of said recess that the free end of the clevis may be swung in more than one direction from said unlocked position without meeting an obstruction from the closure member.

Referring now in detail to the accompanying drawing, Figure 1 shows a tubular closure member 1 for the mouth of a clevis 2. The closure member is provided with a locking recess 3 for receiving the free end of the locking leg 2' of the clevis. The clevis is slidably mounted on the closure member by its other leg 2" for reciprocation between a closed and locked position shown in Fig. 1 in which the free end of the leg 2' is received within the recess 3, and bears against the closure member and a closed, but unlocked, position shown in Fig. 2 in which the free end is clear of the recess. Advantageously, the leg 2' may be of small cross-section so that the free end may be inserted in small openings in sails or other gear. The clevis is also pivotally mounted on the closure member by the leg 2" for swinging movement of the free end of the leg 2' from the closed and unlocked position of Fig. 2 to the open position of Fig. 3, and vice versa. Moreover, the closure member is of a length radially from the pivot leg 2" in the direction of said recess 3 that the clevis may be swung on the leg 2" to either the right or left from the position shown in Fig. 2 without meeting any obstruction from the closure member. The clevis leg 2" is held within the closure member by means of a roll pin 4 passing through the leg and positioned between coil spring 5 and curved thrust bearing 6.

The spring 5 normally bears at one end against roll pin 4 and at its other end against the inner surface of closure member 1, thus urging the clevis to the position shown in Figures 1 and 3.

The eye-bolt 3' is held within the closure member 1 by means of roll pin 7 and curved bearing 8, as shown in Figures 4 and 6. In this arrangement the eye-bolt 3' pivots freely about its axis.

By providing the closure member 1 with opposed apertures and using a longer roll pin 7 as shown in Fig. 7, the eye-bolt may be fixed against movement in the closure member.

Instead of such free-pivoting and fixed arrangements the eye-bolt 3' may be secured as shown in Figure 8. Here, the shank of the eye-bolt is threaded to receive a stop nut 9, which is not large enough to have its sides bear against the inner surface of closure member 1. Thus the eye-bolt 3' may be set to rotate freely or be fixed in a non-rotating locked position when the stop nut 9 is screwed down to force the shoulder 3'' of eye-bolt 3' into tight frictional engagement with closure member 1 as indicated by the dotted-line position shown in Fig. 8.

Instead of an eye-bolt any other suitable connecting means can be used. It might be desirable to have oppositely disposed, similarly connected clevises 10 and 11, as shown in Figure 9, each being connected to the common closure member 12, and lockable, in the same fashion as clevis 2.

In operation, the clevis 2 is normally held in locked position by the action of spring 5, the free end of leg 2' being held in recess 3 of closure member 1 and bearing against the closure member adjacent the recess. When closure member 1 is engaged by the fingers of one hand and the top of clevis 2 by the palm and pressure exerted, the clevis 2 is moved axially against the spring to unlocked position and may be swung to either side of the closure member to any of the positions shown in Figure 3A. In other words, with one hand the shackle may be speedily, freely opened in either direction to any position, and speedily, freely closed from any open position in either direction.

When the clevis is connected to the desired object it may be positively guided, still with one hand, to its locked position because on being pivoted its free end will be caused to bear against the tubular closure member which will, in effect, positively guide it to the recess 3 by a camming action. That is, on further pivoting after contact with the closure member, the clevis will be axially moved on its pivot leg by the closure member so as to cause the free end to snap into locking engagement with the recess under the urging of the spring.

The device is preferably constructed, as shown in the drawings, so that the draw points A and B of the shackle and the oppositely disposed securing member are in alignment, to minimize the effects of stress. In this connection it should be noted that the clevis 2 is held in locked position by recess 3, but that the portion of leg 2' immediately adjacent its free end bears against the outer end surface of the closure member 1 at one end thereof when tension is exerted. In this position also the load in leg 2'' is transmitted via roll pin 4 and thrust bearing 6 to the opposite end of the closure member 1.

Preferably, the components of the device are fabricated from stainless steel, both for strength and for its anti-corrosion properties. From a manufacturing viewpoint, the simplicity of the parts and construction provide a very low production cost.

The invention in its broader aspects is not limited to the specific combinations, improvements and instrumentalities described but departures may be made therefrom within the scope of the accompanying claims without departing from the principles of the invention and without sacrificing its chief advantages.

What is claimed is:

1. A snap shackle device comprising a clevis having a bight, a mounting leg and a locking leg, a closure member for releasably connecting the free end portions of said legs together, said closure member being slidably mounted on and pivotally secured to said mounting leg for reciprocation axially thereof between a locked position in which the closure member spans said bight and connects both of said legs together at a fixed distance from the bight of the clevis, and an unlocked position in which the closure member still spans said bight but is closer to the bight of the clevis and is connected only to said mounting leg, and for swinging movement about said mounting leg in said unlocked position, said closure member having a locking recess located in the space between said legs in the locked position of the closure member on the side of the closure member opposite that facing the bight of said clevis and said closure member being of a length measured from said mounting leg to said locking leg substantially equal to the distance between said legs so that it is free to swing in more than one direction from said unlocked position without meeting obstruction from said locking leg, said locking leg having its free end portion reversely curved to provide a bearing surface portion paralleling said closure member adjacent the tip end of said leg for engaging the recessed side of said closure member in said locked position and to provide at the same side a locking tip portion at an angle to said bearing surface portion for insertion into said locking recess, said locking tip portion being dimensioned to be received in said locking recess; and, means for yieldably holding said clevis and said closure member together in said locked position.

2. A device as in claim 1 in which said closure member is provided with a linking member oppositely disposed to said clevis.

3. A device as in claim 1 in which the closure member is cylindrical and in which said yieldable holding means is a coil spring mounted within said closure member around the pivot leg of said clevis, and urging said clevis to a position where upon being pivoted the free end of said clevis will come in contact with said cylindrical closure member and, on further pivoting will be axially moved on its pivot leg by said closure member so as to cause said free end to snap into locking engagement with said recess under the urging of said spring.

4. A device as in claim 1 in which the pivot leg of said clevis is secured within said closure member by means of a roll pin mounted in an aperture in said pivot leg.

5. A device as in claim 1 in which said closure member is provided with an eye-bolt oppositely disposed to said clevis and pivotally mounted within said closure member by means of a pin passing through the bolt's shank.

6. A device as in claim 1 in which said closure member is provided with an eye-bolt oppositely disposed to said clevis and fixedly mounted within said closure member by means of a roll pin passing through the bolt's shank and into oppositely disposed apertures in said closure member.

7. A device as in claim 1 in which said closure member is provided with an eye-bolt oppositely disposed to said clevis and adjustably axially mounted within said closure member by means of a stop nut threaded on said bolt's shank for releasably securing said eye-bolt against rotation at will.

8. A device as in claim 1 in which said closure member is provided with a pair of such clevises disposed opposite to each other.

9. A snap shackle device in accordance with claim 1 characterized in this that said locking tip portion is at right angles to said bearing surface portion.

10. A snap shackle device in accordance with claim 1 characterized in this that two such clevises are provided at opposite sides of said closure member, said closure member having a locking recess at each of its ends for receiving the respective locking legs of said clevises, and said clevises having their draw points substantially in alignment with each other.

References Cited in the file of this patent

UNITED STATES PATENTS

| | | |
|---|---|---|
| 649,460 | Jordan | May 15, 1900 |
| 1,272,860 | Saindon | July 16, 1918 |
| 1,447,429 | Reimers | Mar. 6, 1923 |
| 1,571,425 | Mataloni | Feb. 2, 1926 |
| 2,258,200 | Baird | Oct. 7, 1941 |
| 2,307,808 | Segal | Jan. 12, 1943 |
| 2,395,762 | Rober | Feb. 26, 1946 |

FOREIGN PATENTS

| | | |
|---|---|---|
| 44,862 | Denmark | November 1931 |
| 47,815 | Germany | July 13, 1889 |